(12) United States Patent
Miyano et al.

(10) Patent No.: US 10,786,870 B2
(45) Date of Patent: Sep. 29, 2020

(54) POWDER SUPPLY APPARATUS, CONTROL METHOD OF POWDER SUPPLY APPARATUS, AND CONTROL PROGRAM OF POWDER SUPPLY APPARATUS, AND THREE-DIMENSIONAL SHAPING APPARATUS

(71) Applicant: TECHNOLOGY RESEARCH ASSOCIATION FOR FUTURE ADDITIVE MANUFACTURING, Tokyo (JP)

(72) Inventors: Hideaki Miyano, Kanagawa (JP); Yoshikazu Ooba, Kanagawa (JP); Yousuke Katou, Kanagawa (JP); Koukichi Suzuki, Kanagawa (JP); Yuya Daicho, Kanagawa (JP)

(73) Assignee: TECHNOLOGY RESEARCH ASSOCIATION FOR FUTURE ADDITIVE MANUFACTURING, Tokyo (JP)

( * ) Notice: Subject to any disclaimer, the term of this patent is extended or adjusted under 35 U.S.C. 154(b) by 492 days.

(21) Appl. No.: 15/119,469

(22) PCT Filed: Mar. 24, 2015

(86) PCT No.: PCT/JP2015/059005
§ 371 (c)(1),
(2) Date: Aug. 17, 2016

(87) PCT Pub. No.: WO2016/151783
PCT Pub. Date: Sep. 29, 2016

(65) Prior Publication Data
US 2017/0050270 A1    Feb. 23, 2017

(51) Int. Cl.
*B23K 26/342* (2014.01)
*B22F 3/105* (2006.01)
(Continued)

(52) U.S. Cl.
CPC ............ *B23K 26/342* (2015.10); *B05C 19/04* (2013.01); *B22F 3/008* (2013.01); *B22F 3/1055* (2013.01);
(Continued)

(58) Field of Classification Search
CPC .. B23K 15/02; B23K 15/0086; B23K 26/342; B23K 26/144; B23K 26/083;
(Continued)

(56) References Cited

U.S. PATENT DOCUMENTS 3,667,422 A * 6/1972 Saladin ................... B05C 19/04
                                                        118/202
4,190,440 A * 2/1980 Klein .................... B22F 1/0088
                                                        419/31
(Continued)

FOREIGN PATENT DOCUMENTS

EP    3 098 064 A1   11/2016
JP    10-211656 A    8/1998
(Continued)

OTHER PUBLICATIONS

International Search Report (ISR) dated Jun. 16, 2015 for International Application No. PCT/JP2015/059005.
(Continued)

*Primary Examiner* — Eric S Stapleton
(74) *Attorney, Agent, or Firm* — Ladas & Parry LLP

(57) ABSTRACT

This invention quickly supplies a predetermined amount of powder from a hopper to a recoater. A powder supply apparatus includes, as its feature, a hopper, a powder spreader, a powder replenisher, and a pivoting unit. The hopper of the powder supply apparatus stores a powder. The powder spreader spreads the powder on a shaping surface. The powder replenisher of the powder supply apparatus is provided between the hopper and the powder spreader, and (Continued)

replenishes the powder spreader with a predetermined amount of powder. The pivoting unit of the powder supply apparatus causes the powder replenisher to pivot.

9 Claims, 14 Drawing Sheets

(51) Int. Cl.
| | |
|---|---|
| B23K 15/00 | (2006.01) |
| B23K 15/02 | (2006.01) |
| B23K 26/144 | (2014.01) |
| B29C 67/00 | (2017.01) |
| B33Y 30/00 | (2015.01) |
| B33Y 40/00 | (2020.01) |
| B33Y 50/02 | (2015.01) |
| B23K 26/08 | (2014.01) |
| B23K 26/14 | (2014.01) |
| B29C 64/165 | (2017.01) |
| B29C 31/02 | (2006.01) |
| B29C 64/20 | (2017.01) |
| B65G 37/00 | (2006.01) |
| B65G 65/30 | (2006.01) |
| B65G 33/08 | (2006.01) |
| B05C 19/04 | (2006.01) |
| B22F 3/00 | (2006.01) |
| B65G 49/00 | (2006.01) |

(52) U.S. Cl.
CPC ......... *B23K 15/0086* (2013.01); *B23K 15/02* (2013.01); *B23K 26/083* (2013.01); *B23K 26/144* (2015.10); *B23K 26/147* (2013.01); *B29C 31/02* (2013.01); *B29C 64/165* (2017.08); *B29C 64/20* (2017.08); *B65G 33/08* (2013.01); *B65G 37/00* (2013.01); *B65G 49/00* (2013.01); *B65G 65/30* (2013.01); *B22F 2003/1056* (2013.01); *B22F 2003/1057* (2013.01); *B22F 2999/00* (2013.01); *B33Y 30/00* (2014.12); *B33Y 40/00* (2014.12); *Y02P 10/295* (2015.11)

(58) Field of Classification Search
CPC ...... B23K 26/147; B22F 3/1055; B22F 3/008; B29C 64/165; B29C 64/20; B29C 31/02; B05C 19/04; B65G 33/08; B65G 37/00; B65G 49/00; B65G 65/30; B33Y 30/00
USPC ........................................................ 219/76.12
See application file for complete search history.

(56) References Cited

U.S. PATENT DOCUMENTS

| | | | | |
|---|---|---|---|---|
| 4,205,986 | A * | 6/1980 | Klein | B22F 1/0088 419/31 |
| 4,349,323 | A * | 9/1982 | Furbish | B29C 31/02 264/105 |
| 5,310,582 | A * | 5/1994 | Vyakarnam | B05C 9/14 118/309 |
| 5,647,931 | A * | 7/1997 | Retallick | B22F 3/004 156/273.3 |
| 6,054,192 | A * | 4/2000 | Otsuka | B29C 41/36 156/272.8 |
| 6,183,232 | B1 * | 2/2001 | Bequette | B22F 1/0077 425/258 |
| 8,550,802 | B2 * | 10/2013 | Fuwa | B22F 3/1055 264/497 |
| 2002/0001534 | A1 * | 1/2002 | Kuniyoshi | B22F 3/004 419/20 |
| 2005/0280185 | A1 * | 12/2005 | Russell | B28B 1/001 264/308 |
| 2007/0092593 | A1 * | 4/2007 | Dopp | B22F 3/004 425/363 |
| 2011/0287185 | A1 * | 11/2011 | Felstead | B22F 3/105 427/277 |
| 2013/0000553 | A1 * | 1/2013 | Hoechsmann | B05C 19/04 118/708 |
| 2013/0333798 | A1 * | 12/2013 | Bosveld | B29C 67/0085 141/2 |
| 2016/0368215 | A1 * | 12/2016 | Miyano | B22F 3/105 |

FOREIGN PATENT DOCUMENTS

| | | |
|---|---|---|
| JP | 2001-269935 A | 10/2001 |
| JP | 2002-292748 A | 10/2002 |
| JP | 2009-279928 A | 12/2009 |
| JP | 2014-188758 A | 10/2014 |

OTHER PUBLICATIONS

Written Opinion (WO) dated Jun. 16, 2015 for International Application No. PCT/JP2015/059005.
J-PlatPat English abstract of JP 2009-279928 A.
J-PlatPat English abstract of JP 2002-292748 A.
J-PlatPat English abstract of JP 10-211656 A.
J-PlatPat English abstract of JP 2001-269935 A.
J-PlatPat English abstract of JP 2014-188758 A.
Extended European Search Report (EESR) dated Mar. 8, 2018 for European Application 15 886 336.5.

\* cited by examiner

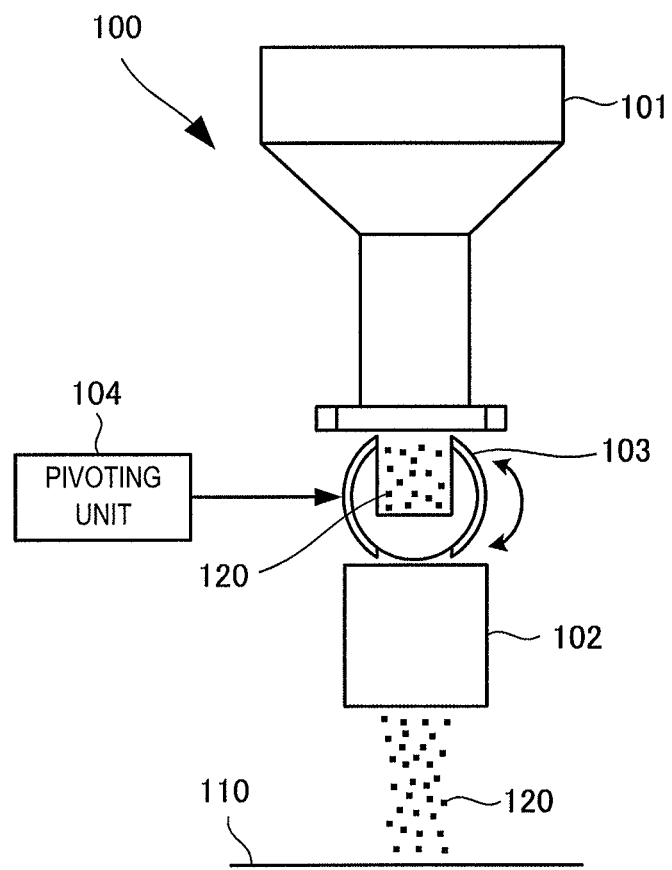
F I G. 1

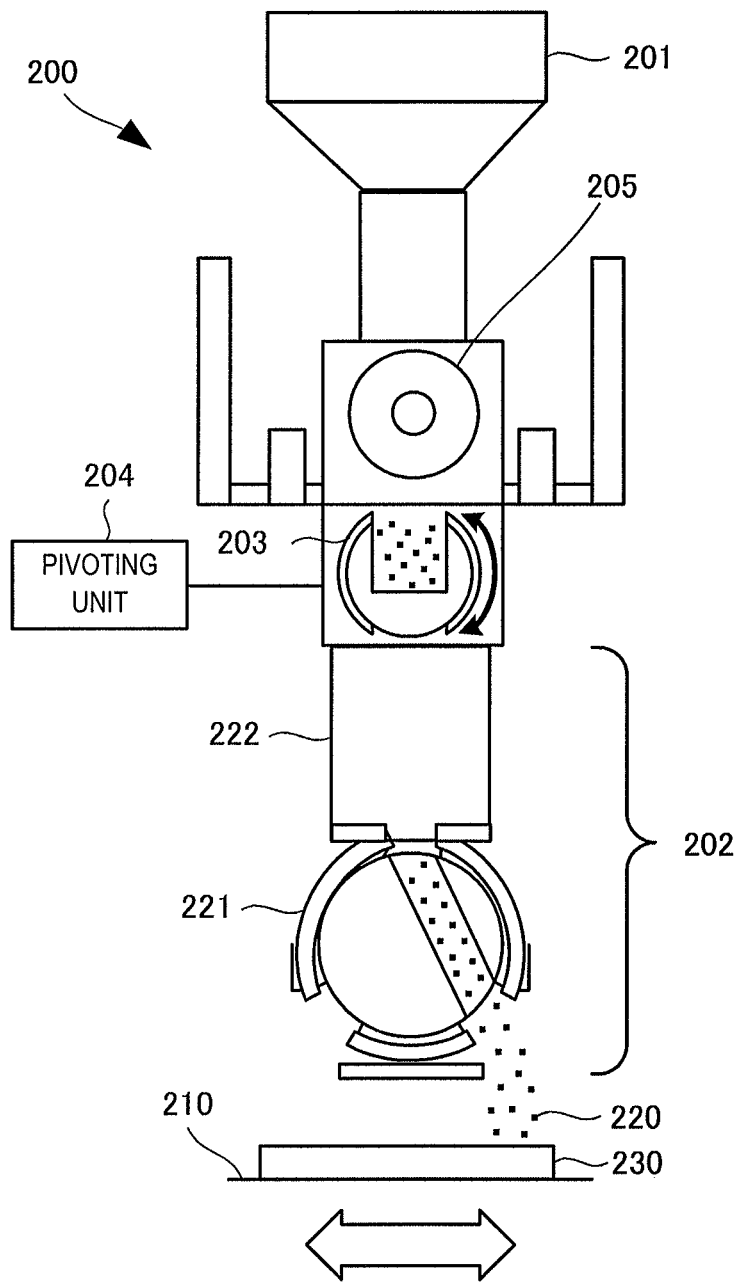
F I G. 2

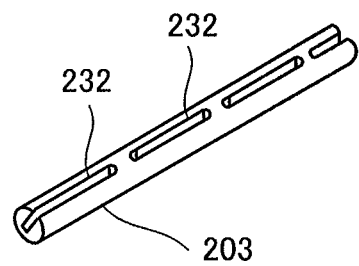
F I G. 4B

POWDER SUPPLY APPARATUS, CONTROL METHOD OF POWDER SUPPLY APPARATUS, AND CONTROL PROGRAM OF POWDER SUPPLY APPARATUS, AND THREE-DIMENSIONAL SHAPING APPARATUS

RELATED APPLICATION

This application is an application under 35 U.S.C. 371 of International Application No. PCT/JP2015/059005 filed on Mar. 24, 2015, the entire contents of which are incorporated herein by reference.

TECHNICAL FIELD

The present invention relates to a powder supply apparatus, a control method of the powder supply apparatus, and a control program of the powder supply apparatus, and a three-dimensional shaping apparatus.

BACKGROUND ART

In the above technical field, patent literature 1 discloses a technique of supplying a powder material by a tubular member including a screw member.

CITATION LIST

Patent Literature

Patent literature 1: Japanese Patent Laid-Open No. 2009-279928

SUMMARY OF THE INVENTION

Technical Problem

The technique described in patent literature 1, however, cannot quickly supply a predetermined amount of powder.

The present invention enables to provide a technique of solving the above-described problem.

Solution to Problem

One aspect of the present invention provides a powder supply apparatus comprising:
 a hopper that stores a powder;
 a powder spreader that spreads the powder on a shaping surface;
 a powder replenisher that is provided between the hopper and the powder spreader, and replenishes the powder spreader with a predetermined amount of powder; and
 a pivoting unit that causes the powder replenisher to pivot.

Another aspect of the present invention provides a control method of a powder supply apparatus including a hopper, a powder replenisher, a powder supplier, and a pivoting unit, comprising:
 supplying a powder to the powder replenisher by storing the powder in the hopper;
 replenishing the powder spreader with the powder supplied from the hopper by causing the powder replenisher to pivot using the pivoting unit to supply the powder to the powder spreader; and spreading, on a shaping surface, the powder replenished from the powder replenisher.

Still other aspect of the present invention provides a control program of a powder supply apparatus including a hopper, a powder replenisher, a powder supplier, and a pivoting unit, for causing a computer to execute a method, comprising:
 supplying a powder to the powder replenisher by storing the powder in the hopper;
 replenishing the powder spreader with the powder supplied from the hopper by causing the powder replenisher to pivot using the pivoting unit to supply the powder to the powder spreader; and spreading, on a shaping surface, the powder replenished from the powder replenisher.

Advantageous Effects of Invention

According to the present invention, it is possible to quickly supply a predetermined amount of powder from a hopper to a recoater.

BRIEF DESCRIPTION OF DRAWINGS

FIG. 1 is a schematic side view showing the arrangement of a powder supply apparatus according to the first embodiment of the present invention;

FIG. 2 is a schematic side view showing the arrangement of a powder supply apparatus according to the second embodiment of the present invention;

FIG. 4B is a perspective view showing the powder replenisher of the powder supply apparatus according to the second embodiment of the present invention;

DESCRIPTION OF THE EMBODIMENTS

Figure 3A:
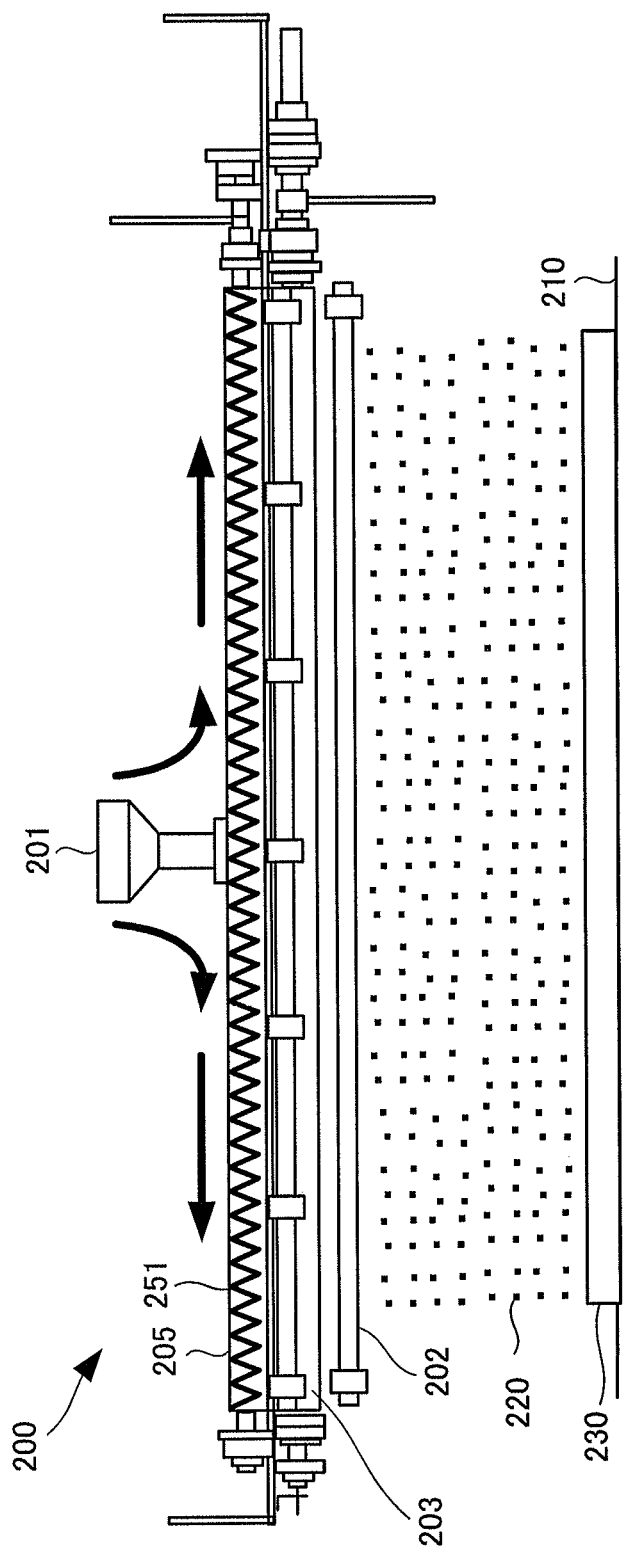
FIG. 3A is a schematic front view showing the arrangement of the powder supply apparatus according to the second embodiment of the present invention.

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

A powder supply apparatus 100 as the first embodiment of the present invention will be described with reference to FIG. 1. The powder supply apparatus 100 is an apparatus for supplying, onto a shaping surface, a powder such as a metal or resin as the shaping material of a three-dimensional shaped object to be shaped by laminating and shaping.

As shown in FIG. 1, the powder supply apparatus 100 includes a hopper 101, a powder spreader 102, a powder replenisher 103, and a pivoting unit 104. The hopper 101 stores a powder 120 as the shaping material of a three-dimensional shaped object. The powder spreader 102 spreads the powder on a shaping surface 110. The powder replenisher 103 is provided between the hopper 101 and the powder spreader 102, and replenishes the powder spreader 102 with a predetermined amount of powder. The pivoting unit 104 causes the powder replenisher 103 to pivot.

According to this embodiment, it is possible to quickly supply a predetermined amount of powder from the hopper to a recoater.

Second Embodiment

A powder supply apparatus according to the second embodiment of the present invention will be described with reference to FIGS. 2 to 5D. FIG. 2 is a schematic side view for explaining the arrangement of a powder supply apparatus 200 according to this embodiment. The powder supply apparatus 200 includes a hopper 201, a powder spreader 202, a powder replenisher 203, a pivoting unit 204, and an intermediate hopper 205.

The hopper 201 stores a powder 220 such as a metal or resin as the shaping material of a three-dimensional shaped object. The hopper 201 supplies the powder 220 to the intermediate hopper 205. The intermediate hopper 205 supplies, to the powder replenisher 203, the powder 220 supplied from the hopper 201.

The powder replenisher 203 is a circular prismatic member in which a groove having a rectangular section is formed in a side surface, as shown in FIG. 2. The pivoting unit 204 causes the powder replenisher 203 to pivot. When the powder spreader 202 is at a predetermined position, the powder replenisher 203 pivots to quickly supply a predetermined amount of powder 220 to the powder spreader 202. Upon completion of replenishment of the powder spreader 202 with the powder 220, the pivoting unit 204 causes the powder replenisher 203 to pivot again to return to the original position. The pivoting unit 204 is, for example, a servo motor or stepping motor, but is not limited to them.

The powder spreader 202 includes a recoater 221 and an intermediate storage 222. The recoater 221 is replenished with the powder 220 not directly from the powder replenisher 203 but via the intermediate storage 222 integrally provided in the recoater 221. The powder spreader 202 spreads the powder 220 replenished from the powder replenisher 203 while scanning on a shaping surface 210, thereby laminating the powder 220 as the shaping material of a shaped object 230.

If the powder spreader 202 spreads the powder 220 while moving on the shaping surface 210, the powder spreader 202 and the powder replenisher 203 are separated and the powder spreader 202 moves. Therefore, while the powder spreader 202 scans on the shaping surface 210, the recoater 221 cannot be replenished with the powder 220 from the powder replenisher 203. To cope with this, by integrally providing the intermediate storage 222 in the recoater 221, the recoater 221 spreads the powder 220 on the shaping surface 210 while being supplied with the powder 220 from the intermediate storage 222.

Figure 3B:
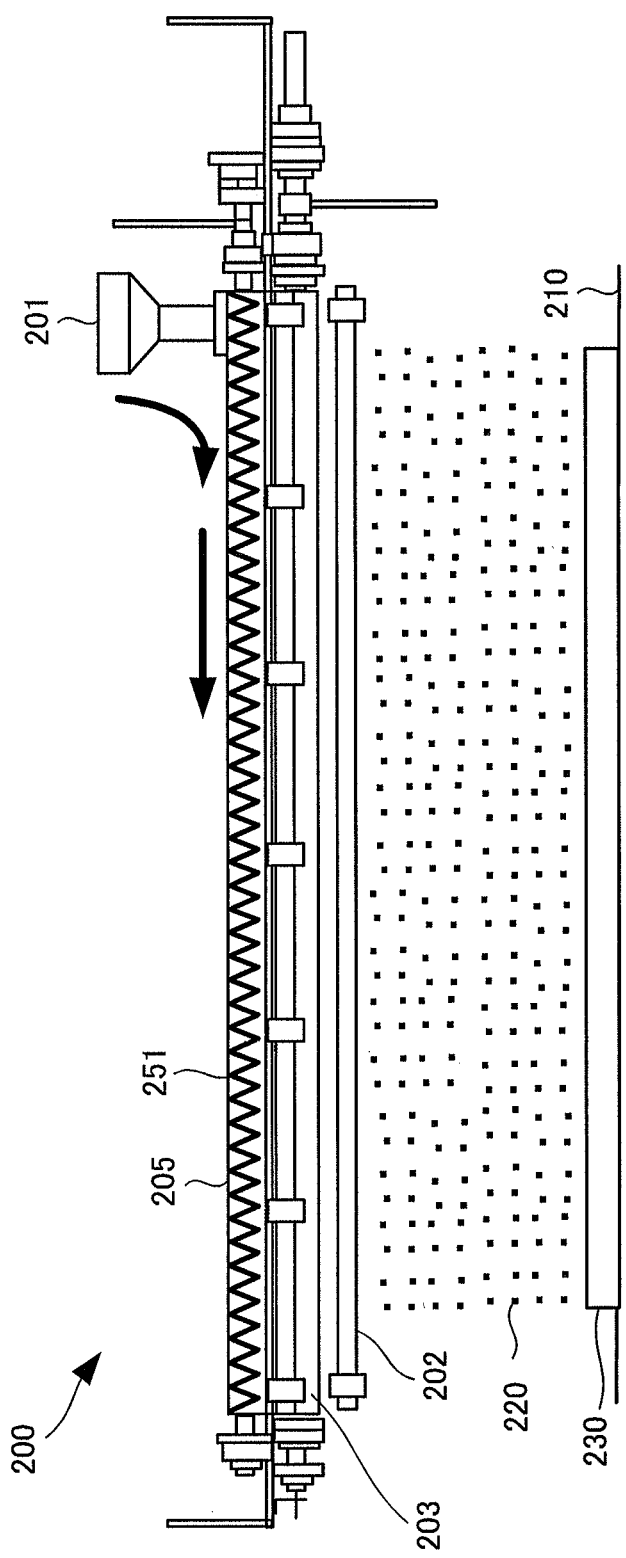
FIG. 3B is a schematic front view showing the arrangement of the powder supply apparatus according to the second embodiment of the present invention.
Figure 3C:
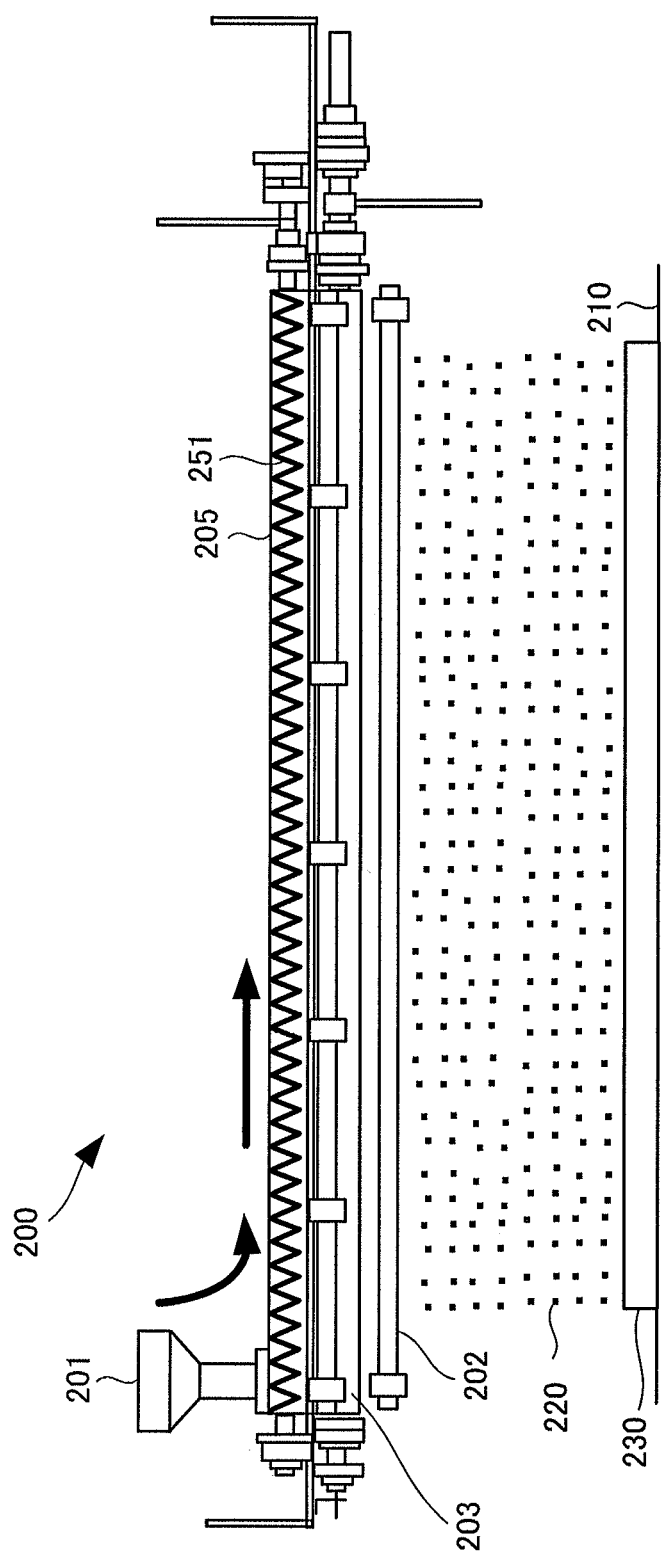
FIG. 3C is a schematic front view showing the arrangement of the powder supply apparatus according to the second embodiment of the present invention.

FIGS. 3A to 3C are schematic front views for explaining the arrangement of the powder supply apparatus 200 according to this embodiment. As shown in FIGS. 3A to 3C, the powder replenisher 203 and the intermediate hopper 205 each have a long shape in the horizontal direction. The full length of the powder replenisher 203 is about 1 to 2 m, and the powder replenisher 203 may be formed by one member, or a plurality of members, for example, a plurality of coupled members each having a length of about several ten cm. By coupling a plurality of members, for example, it is possible to increase the strength of the powder replenisher 203 and readily perform maintenance.

The hopper 201 is arranged at almost the center of the intermediate hopper 205. The hopper 201 can supply the powder 220 within only a narrow range. Consequently, if the powder spreader 202 and the powder replenisher 203 are horizontally long members, it is impossible to supply the powder 220 uniformly. If an attempt is made to supply the powder 220 to the horizontally long powder replenisher 203 using only the hopper 201, the hopper 201 needs to be increased in size, resulting in an increase in size of the overall apparatus.

To cope with this, the intermediate hopper 205 has a powder transfer mechanism such as a screw conveyor 251. The screw conveyor 251 transfers the powder 220 supplied from the hopper 201 to the intermediate hopper 205 while stirring the powder 220 toward the right and left ends of the intermediate hopper 205.

The number of installed hoppers 201 is not limited to one, and a plurality of hoppers 201 may be installed. If a plurality of hoppers 201 are installed, even while one hopper is replenished with the powder 220, the remaining hoppers can supply the powder 220. Thus, it is possible to continue shaping the shaped object 230 without stopping the apparatus. Note that the arrangement position of the hopper 201 is not limited to the central position of the intermediate hopper 205, and may be the right or left end position of the intermediate hopper 205, as shown in FIG. 3B or 3C.

Installing a plurality of hoppers 201 makes it possible to shorten the time taken for replenishment of the powder 220. In addition, since the full length of the intermediate hopper 205 is long, installing a plurality of hoppers 201 can prevent a problem that, for example, the powder 220 is not uniformly spread in the whole intermediate hopper 205.

If the number of installed hoppers 201 is one, the hopper 201 increases in size to spread a large amount of powder 220 or perform laminating and shaping for a long time. In addition, it is necessary to arrange a heavy object on the powder supply apparatus 200. This has a demerit, for example, the weight of the overall apparatus increases. Therefore, although not shown, a hose or the like may be connected to the intermediate hopper 205 instead of the hopper 201, and the powder 220 may be supplied from a powder supply source to the intermediate hopper 205 through the hose by force feed or the like. This can cope with a case in which a large amount of powder 220 is necessary, a case in which it is necessary to perform shaping for a long time, a case in which it is desirable to decrease the size of the overall apparatus, and the like.

The screw conveyor 251 provided in the intermediate hopper 205 may be a shaft or shaftless conveyor. Furthermore, a screw feeder may be provided as the powder transfer mechanism. The present invention is not limited to them as long as the mechanism can transfer the powder 220. The intermediate hopper 205 may be inclined or tapered without using the screw conveyor 251 or the like. Furthermore, the screw conveyor 251 or the like and inclination or the like may be combined. By providing such powder transfer mechanism, segregation of the powder 220 spread on the shaping surface 210 can be reduced.

Figure 4A:
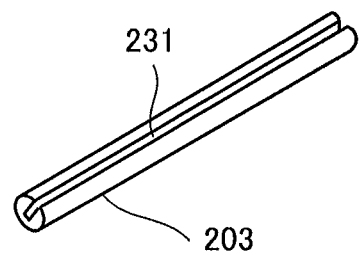
FIG. 4A is a perspective view showing the powder replenisher of the powder supply apparatus according to the second embodiment of the present invention.

FIGS. 4A and 4B are perspective views each showing the powder replenisher 203 of the powder supply apparatus 200 according to this embodiment. In each of FIGS. 4A and 4B, the powder replenisher 203 has a circular prismatic shape. However, the shape of the powder replenisher 203 is not limited to this, and may be a quadrangular or polygonal prismatic shape.

As shown in FIG. 4A, one groove 231 is formed in the side surface of the powder replenisher 203. The groove 231 is provided in a direction along the central axis of the powder replenisher 203 having the circular prismatic shape. As shown in FIG. 4B, a plurality of grooves 232 may be formed in a slit shape.

FIGS. 5A to 5D are sectional views for explaining the shape of the groove 231 of the powder replenisher 203. As shown in FIGS. 5A to 5D, the sectional shape of the groove 231 may be any of rectangular, triangular, and semicircular shapes as long as it is possible to store a predetermined amount of powder.

Figure 5A:
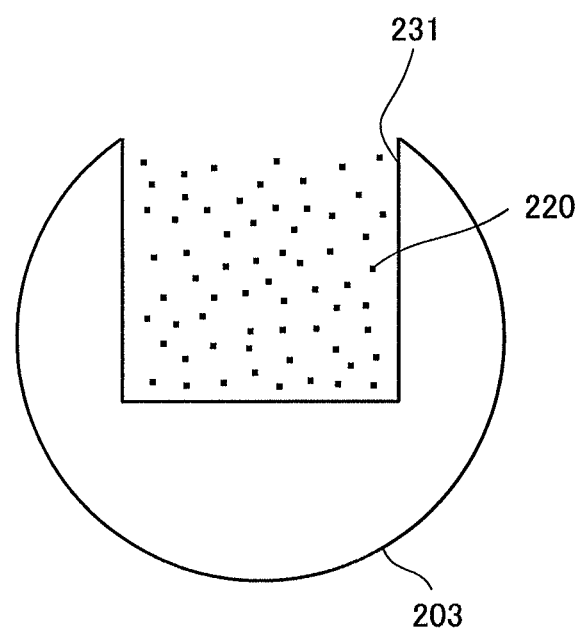
FIG. 5A is a sectional view showing the powder replenisher of the powder supply apparatus according to the second embodiment of the present invention.

By forming the groove 231 to have a rectangular sectional shape shown in FIG. 5A, the groove 231 can have a large capacity to increase the processing amount and stored amount of the powder 220. Furthermore, the manufacturing cost of the powder replenisher 203 can be reduced.

Figure 5B:
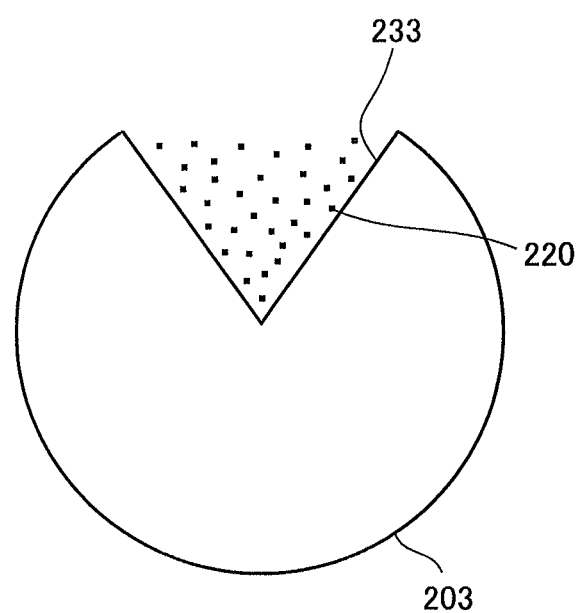
FIG. 5B is a sectional view showing the powder replenisher of the powder supply apparatus according to the second embodiment of the present invention.

By forming the groove 233 to have a triangular sectional shape shown in FIG. 5B, the powder 220 readily drops. For example, especially if the powder 220 is wet by containing moisture, the powder 220 is difficult to adhere to the inner surface of the groove 233. Furthermore, the strength of the powder replenisher 203 is relatively readily maintained. For example, as for the rectangular sectional shape described above, if the depth of the groove 233 is made too large, the powder replenisher 203 readily bends. However, if the sectional shape is a fan or triangular shape, it is possible to reduce the possibility of breakage.

Figure 5C:
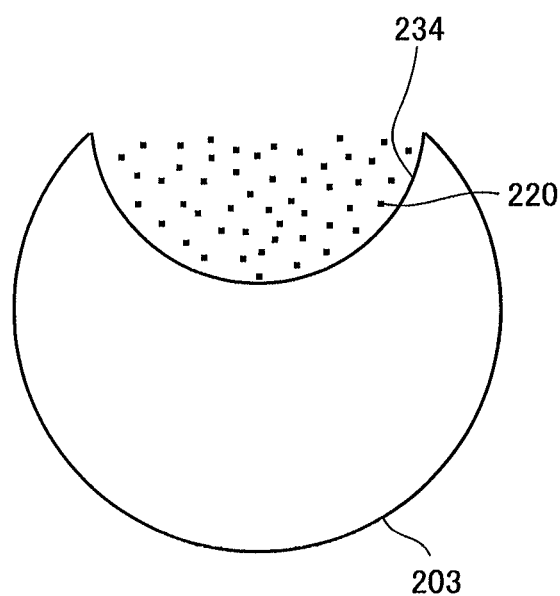
FIG. 5C is a sectional view showing the powder replenisher of the powder supply apparatus according to the second embodiment of the present invention.

By forming the groove 234 to have a semicircular sectional shape shown in FIG. 5C, the groove 234 can keep a capacity to contain the powder 220. As in a case in which the groove 234 has a rectangular or triangular shape, it becomes easy to prevent the powder 220 from adhering to the corner of the groove 234 to remain in the groove 234.

Figure 5D:
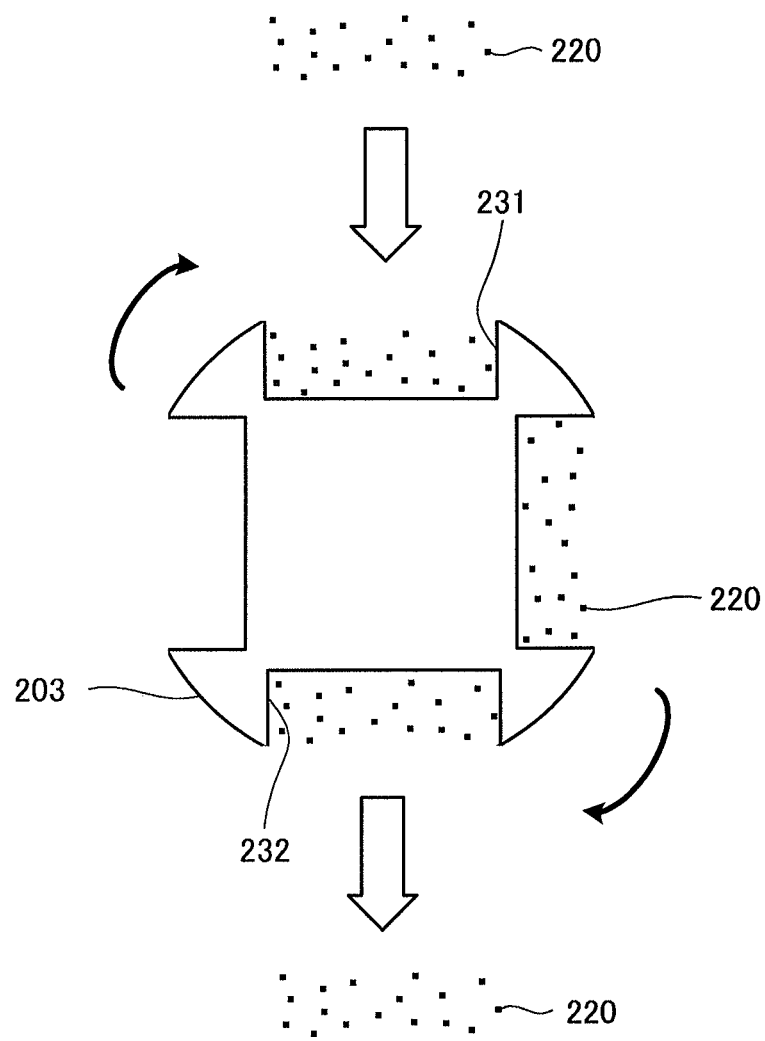
FIG. 5D is a sectional view showing the powder replenisher of the powder supply apparatus according to the second embodiment of the present invention.

As shown in FIG. 5D, the number of grooves 231 formed in the powder replenisher 203 is not limited to one, and a plurality of grooves 231 may be formed. With this arrangement, while supplying the powder 220 to the groove 231, the powder 220 can be supplied from another groove 232 to the powder spreader 202. This is thus effective if it takes a long time to supply the powder 220 to the grooves 231. It is also possible to supply the powder 220 to the powder spreader 202 more quickly.

In the example shown in FIG. 5D, the four grooves 231 are formed. However, the number of grooves 231 may be two, three, four, or more. In this case, the powder replenisher 203 may be caused to pivot or rotated in one direction, which can be set by the user, as needed, in accordance with an application purpose.

According to this embodiment, with the above-described arrangement, it is possible to correctly and quickly measure a predetermined amount of powder, for example, an amount for one layer, and supply the predetermined amount of powder from the hopper to the recoater at high speed. Furthermore, it is not necessary to vibrate the hopper, and it is thus possible to use the powder without concern for the fluidity of the powder. Since it is possible to correctly measure the predetermined amount, no material, for example, no powder is wasted.

Third Embodiment

Figure 6:
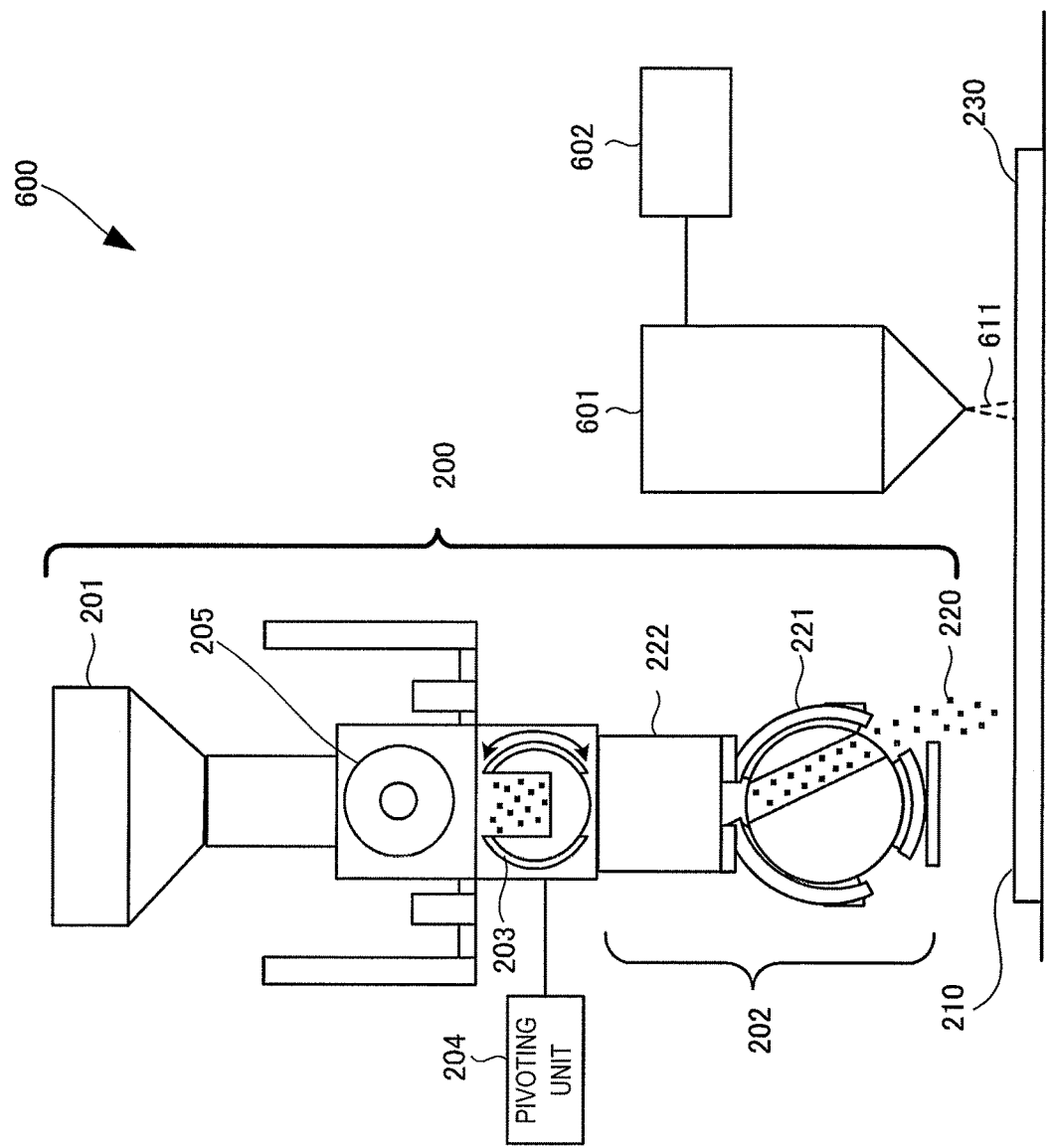
FIG. 6 is a schematic front view showing the arrangement of a three-dimensional shaping apparatus according to the third embodiment of the present invention.

A three-dimensional shaping apparatus according to the third embodiment of the present invention will be described with reference to FIGS. 6 to 8. FIG. 6 is a schematic front view for explaining the overall arrangement of the three-dimensional shaping apparatus according to this embodiment. A three-dimensional shaping apparatus 600 according to this embodiment is an apparatus using the powder supply apparatus according to the second embodiment. Therefore, the arrangement and operation of a powder supply apparatus in FIG. 6 are the same as those in the second embodiment, so the same reference numerals denote the same arrangement and operation and a detailed description thereof will be omitted.

The three-dimensional shaping apparatus 600 includes a powder supply apparatus 200, a sprayer 601, and a supplier 602. The sprayer 601 sprays a binder 611 to a powder 220 spread on a shaping surface 210, and solidifies the powder 220. Note that an irradiator for irradiating the powder 220 on the shaping surface 210 with a laser beam or electron beam may be provided instead of the sprayer 601, and can be selected, as needed, in accordance with the properties of the powder 220 or the type or application purpose of a shaped object 230. The supplier 602 supplies a binder or purge gas, but a supplied material is not limited to them, and a supplied material necessary for three-dimensional shaping can be supplied, as needed. Note that FIG. 6 does not show other general-purpose devices and mechanisms of the three-dimensional shaping apparatus 600.

Figure 7:
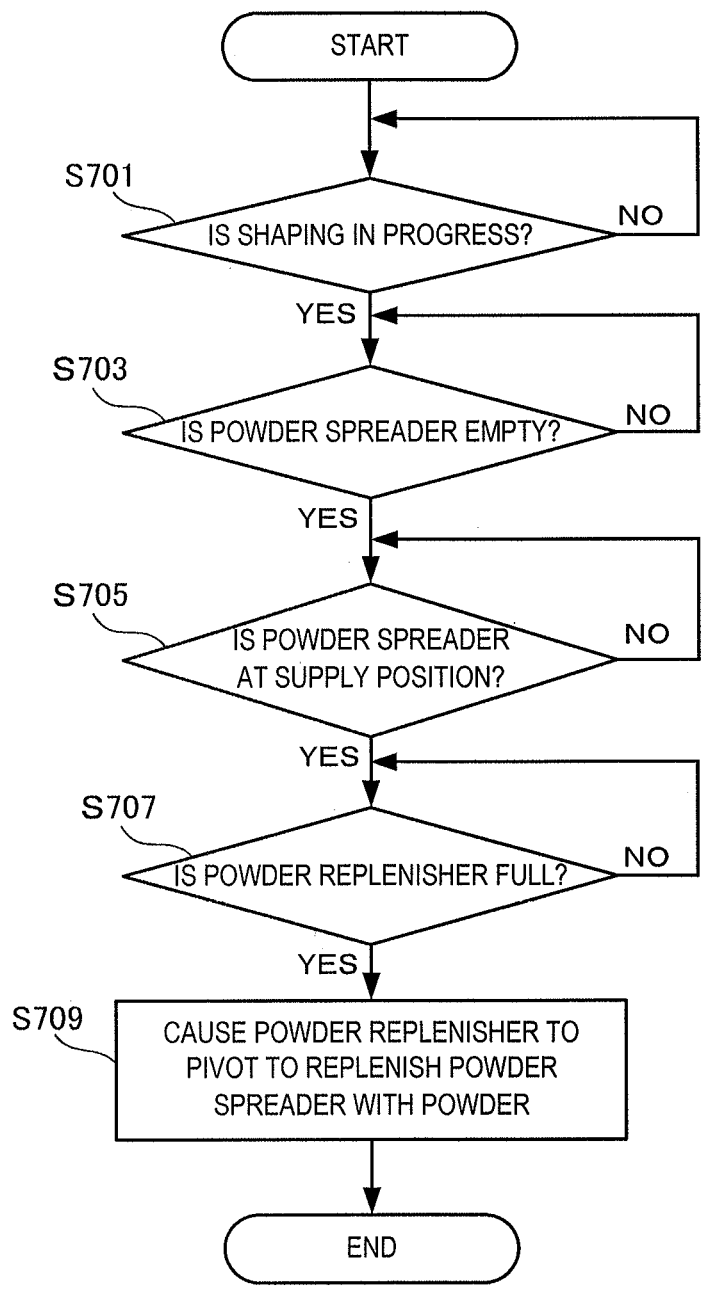
FIG. 7 is a flowchart illustrating the control procedure of the powder spreader of the three-dimensional shaping apparatus according to the third embodiment of the present invention.

FIG. 7 is a flowchart for explaining the control procedure of a powder spreader 202 of the three-dimensional shaping apparatus according to this embodiment. In step S701, the three-dimensional shaping apparatus 600 determines whether an operation of shaping a three-dimensional shaped object is in progress. If the shaping operation is not in progress, the three-dimensional shaping apparatus 600 stands by until the shaping operation starts.

If the shaping operation is in progress, the three-dimensional shaping apparatus 600 determines in step S703 whether an intermediate storage 222 and recoater 221 of the powder spreader 202 are empty. If the powder spreader 202 and the like are not empty, the three-dimensional shaping apparatus 600 stands by until the powder spreader 202 and the like become empty; otherwise, the three-dimensional shaping apparatus advances to the next step.

In step S705, the three-dimensional shaping apparatus 600 determines whether the powder spreader 202 is at a supply position. If the powder spreader 202 is not at the supply position, the three-dimensional shaping apparatus 600 stands by until the powder spreader 202 returns to the supply position; otherwise, the three-dimensional shaping apparatus 600 advances to the next step.

In step S707, the three-dimensional shaping apparatus 600 determines whether a powder replenisher 203 is full. If the powder replenisher 203 is not full, the three-dimensional shaping apparatus 600 stands by until the powder replenisher 203 becomes full; otherwise, the three-dimensional shaping apparatus 600 advances to the next step.

In step S709, the three-dimensional shaping apparatus 600 moves the powder replenisher 203 to replenish the powder spreader 202 with the powder 220.

Figure 8:
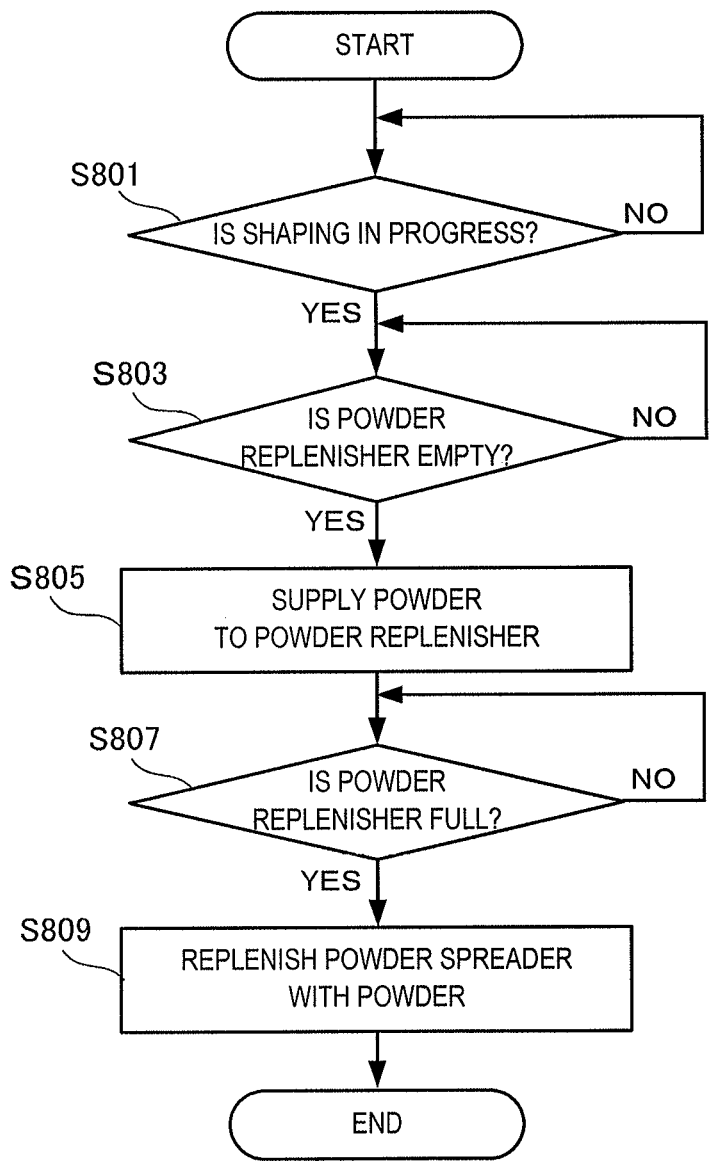
FIG. 8 is a flowchart illustrating the control procedure of the powder replenisher of the three-dimensional shaping apparatus according to the third embodiment of the present invention.

FIG. 8 is a flowchart for explaining the control procedure of the powder replenisher 203 of the three-dimensional shaping apparatus according to this embodiment. In step S801, the three-dimensional shaping apparatus 600 determines whether an operation of shaping a three-dimensional shaped object is in progress. If the shaping operation is not in progress, the three-dimensional shaping apparatus 600 stands by until the shaping operation starts.

If the shaping operation is in progress, the three-dimensional shaping apparatus 600 determines in step S803 whether the powder replenisher 203 is empty. If the powder replenisher 203 is not empty, the three-dimensional shaping apparatus 600 stands by until the powder replenisher 203 becomes empty.

If the powder replenisher 203 is empty, the three-dimensional shaping apparatus 600 supplies, in step S805, the powder 220 to the powder replenisher 203 from an intermediate hopper 205 or the like.

In step S807, the three-dimensional shaping apparatus 600 determines whether the powder spreader 202 is full. If the powder spreader 202 is full, the three-dimensional shaping apparatus 600 stands by until the powder spreader 202 becomes empty. If the powder spreader 202 is empty, the three-dimensional shaping apparatus 600 advances to the next step.

In step S809, the three-dimensional shaping apparatus 600 moves the powder replenisher 203 to replenish the powder spreader 202 with the powder 220.

Note that the control procedures of the powder spreader 202 and powder replenisher 203 have been individually described with reference to FIGS. 7 and 8. However, the powder spreader 202 and the powder replenisher 203 may operate in cooperation with each other, or may individually operate.

According to this embodiment, since it is possible to correctly and quickly measure a predetermined amount of powder, for example, an amount for one layer, and supply the predetermined amount of powder from the hopper to the recoater at high speed, the recoater need not wait for supply of the powder, and it is possible to correctly laminate a shaped object without wasting the material such as the powder. Furthermore, since the powder is not supplied using vibration, there is no mechanism of restricting the powder supply speed, thereby making it possible to supply the powder at high speed. Since there is no extra mechanism, the running cost and maintenance cost are reduced and the operating ratio of the three-dimensional shaping apparatus is improved without any failure of a machine or need of maintenance.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a system including a plurality of devices or a single apparatus. The present invention is also applicable even when an information processing program for implementing the functions of the embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described embodiments.

The invention claimed is:

1. A powder supply apparatus comprising:
a first hopper that stores a powder;
a powder spreader having a width of a shaping surface that includes a recoater with an intermediate storage and spreads the powder on the shaping surface while moving on the shaping surface, the recoater spreading the powder on the shaping surface while being supplied with the powder from the intermediate storage;
a powder replenisher that is provided between said first hopper and said powder spreader, and replenishes said powder spreader with a predetermined amount of powder;
a pivoting unit that causes said powder replenisher to pivot and comprises a motor; and
an intermediate hopper that is provided between said first hopper and said powder replenisher, wherein
said intermediate hopper is of a size that extends at least across the width of the shaping surface in a direction perpendicular to the direction of relative motion of the powder spreader and the shaping surface,
said first hopper is arranged above a part of said intermediate hopper and supplies the powder to the part of the intermediate hopper,
said intermediate hopper has the width of the shaping surface and includes a screw conveyor that transfers, from the part of the intermediate hopper to an overall width of the intermediate hopper, and
said powder spreader is separated from said powder replenisher while said powder spreader moves on the shaping surface.

2. The powder supply apparatus according to claim 1, wherein said powder replenisher is a prismatic member, and has, on a side surface, at least one groove for containing the powder in a direction along a central axis.

3. The powder supply apparatus according to claim 2, wherein a sectional shape of the groove is one of a rectangular shape, a semicircular shape, and a triangular shape.

4. The powder supply apparatus according to claim 2, wherein the groove comprises a plurality of grooves in a slit shape in the direction along the central axis.

5. The powder supply apparatus according to claim 1, wherein the motor of said pivoting unit is a servo motor.

6. A control method of a powder supply apparatus according to claim 1, comprising:
supplying a powder to the powder replenisher by storing the powder in the first hopper;
replenishing the powder spreader with the powder supplied from the first hopper by causing the powder replenisher to pivot using the pivoting unit to supply the powder to the powder spreader; and
spreading, on a shaping surface, the powder replenished from the powder replenisher.

7. A non-transitory computer-readable storage medium storing a control program of a powder supply apparatus according to claim 1, for causing a computer to execute a method, comprising:
   supplying a powder to the powder replenisher by storing the powder in the hopper;
   replenishing the powder spreader with the powder supplied from the hopper by causing the powder replenisher to pivot using the pivoting unit to supply the powder to the powder spreader; and
   spreading, on a shaping surface, the powder replenished from the powder replenisher.

8. A three-dimensional shaping apparatus comprising:
   a powder supply apparatus defined in claim 1; and
   at least one of a sprayer that sprays a binder to a powder and an irradiator that irradiates the powder with one of a laser beam and an electron beam.

9. The powder supply apparatus according to claim 1, wherein said first hopper supplies said powder to a part of said intermediate hopper in a width direction.

* * * * *